BIDIRECTIONAL ANALOG GATE

Filed Nov. 22, 1968

Inventor
Thomas J. Davis
Roland A. Gruber...
Attorney

United States Patent Office 3,546,485
Patented Dec. 8, 1970

3,546,485

BIDIRECTIONAL ANALOG GATE

Thomas J. Davis, Richland, Wash., assignor to the United States of America as represented by the United States Atomic Energy Commission

Filed Nov. 22, 1968, Ser. No. 778,103
Int. Cl. H03k *17/00*
U.S. Cl. 307—255 6 Claims

ABSTRACT OF THE DISCLOSURE

A bidirectional analog gate responsive to a binary control signal includes a pair of differentially coupled balanced amplifier circuits, an impedance means, and switch means responsive to first and second values of the binary control signal for respectively connecting and disconnecting the impedance means in one of the pair of amplifier circuits.

CONTRACTUAL ORIGIN OF THE INVENTION

The invention described herein was made in the course of, or under, a contract with the United States Atomic Energy Commission.

BACKGROUND OF THE INVENTION

This invention relates to analog gating circuitry and more particularly to bidirectional analog gates which are controlled by a binary control signal.

One of the major problems in designing active-element analog gating circuitry resides in suppressing the presence of the gating control signal in the gating circuit output. In designing unidirectional gates, this problem may be overcome by employing series or shunt gating elements which are operated at saturation or cutoff. In bidirectional gates, however, the control signal is usually present in serious magnitude at the output. It manifests itself in the form of a flat topped pulse, differentiated spikes from leading and trailing edges of the control signal, or in spikes resulting from noncoincident switching times of the gating elements.

It is therefore an object of the present invention to provide an improved bidirectional analog gate which is responsive to a binary control signal.

It is another object of the present invention to provide a bidirectional analog gate which suppresses the presence of the gate control signal in the output thereof.

It is still another object of the present invention to provide a bidirectional analog gate which has a fast switching time.

It is yet another object of the present invention to provide a bidirectional analog gate which has a wide linear dynamic range.

SUMMARY OF THE INVENTION

In accordance with the invention, an analog signal to be gated by a binary control signal is applied to both inputs of a pair of differentially coupled amplifier circuits. One of the pair of amplifier circuits includes an impedance means in series with a switch means. The switch means is opened and closed in response to first and second values of the binary control signal, thereby respectively removing and inserting the impedance means in the associated amplifier circuit. The pair of amplifier circuits, providing a balanced output with the impedance means removed, are unbalanced by the insertion of the impedance means. A difference amplifier connected across the output of the pair of amplifiers then provides an output representative of the input analog signal when the pair of amplifiers are unbalanced and provides no output when the pair of amplifiers are balanced.

BRIEF DESCRIPTION OF THE DRAWINGS

A more complete understanding of the invention will best be obtained from consideration of the accompanying drawings in which.

PREFERRED EMBODIMENT OF THE INVENTION

Figure 1:
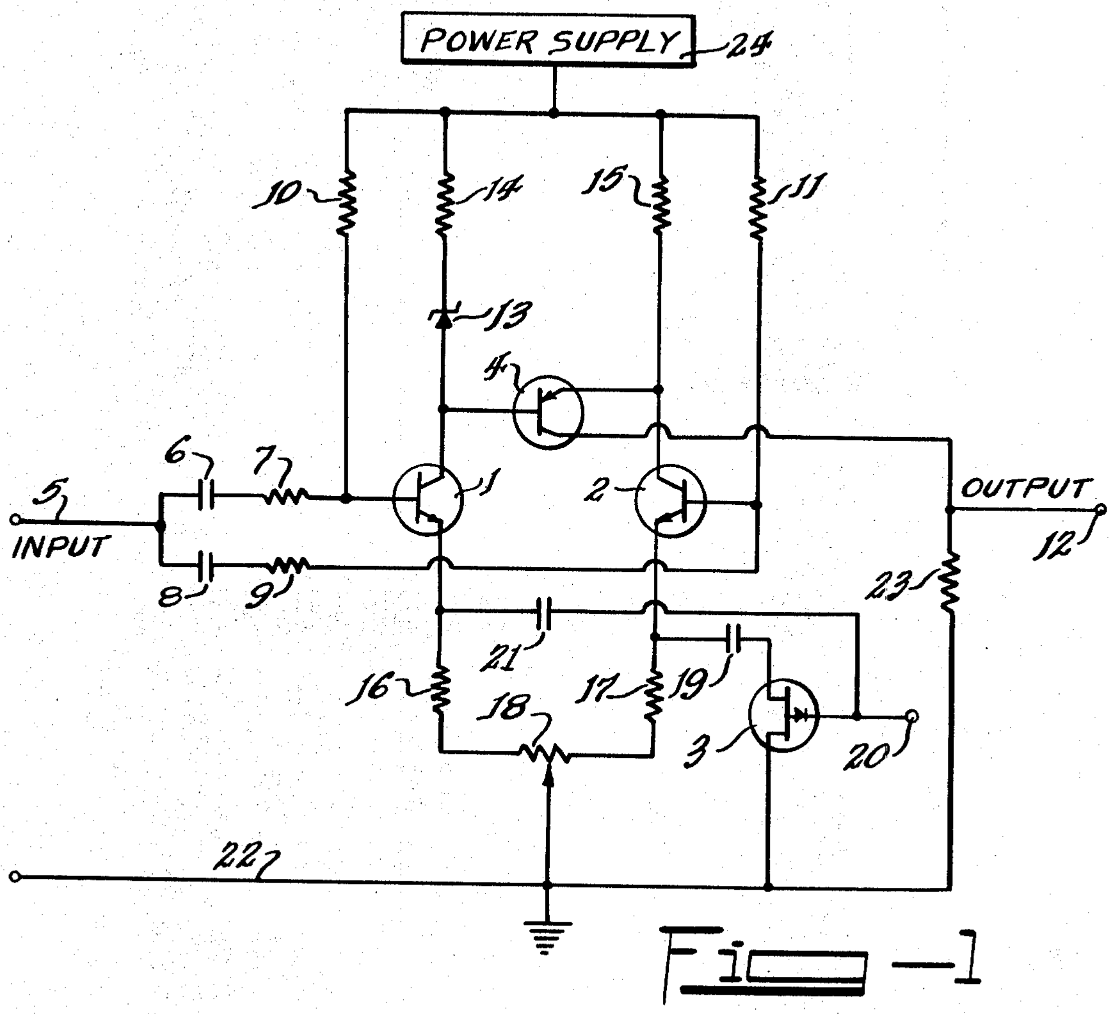
FIG. 1 is a circuit diagram of a preferred embodiment of the analog gate for the practice of the present invention.

Referring now to FIG. 1, the analog signal to be gated is coupled to a pair of transistors 1 and 2 via a signal input line 5 and transistor base input circuits. The base of transistor 1 is coupled to the signal input line 5 via a series connected resistor 7 and capacitor 6. Similarly, the base of transistor 2 is coupled to the signal input line 5 via a series connected resistor 9 and capacitor 8. Base bias voltages to transistors 1 and 2 are supplied by a power supply 24, via resistors 10 and 11, respectively. The collector of transistor 1 is connected to the base of a transistor 4 and, via a series connected Zener diode 13 and resister 14, to the power supply 24. The collector of transistor 2 is connected to the emitter of transistor 4 and, via a resistor 15, to the power supply 24. The collector of transistor 4 is connected to an output line 12 of the present analog gate and, via a resistor 23, to a common reference line 22. The emitters of transistors 1 and 2 are connected to the stationary terminals of a potentiometer 18, via resistors 16 and 17, respectively. The adjustable terminal of the potentiometer 18 is connected to the common reference line 22.

A field effect transistor 3 has its source terminal connected to the common reference line 22 and its drain terminal to the emitter of transistor 2, via capacitor 19. The binary control signal is coupled, via a control line 20, to the gate terminal of transistor 3 and to the emitter of transistor 1, via a capacitor 21.

Figure 2:
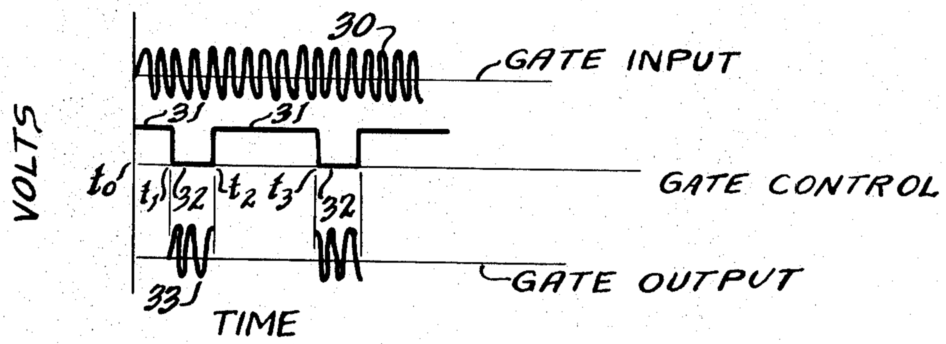
FIG. 2 is a graphical representation illustrating the timed relationship between gate input and output signals, and the binary control input of the analog gate illustrated in FIG. 1.

Referring now to FIG. 1 and FIG. 2, the operation of the analog gate may be described as follows.

Initially, and with transistor 3 turned off, the differential pair of transistors 1 and 2 are balanced by adjusting the potentiometer 18.

At time $t_0$, an analog input signal, such as the sine wave 30 in FIG. 2, is applied to the signal input line 5 and a first voltage level 31 of the binary control signal of sufficient magnitude to turn off transistor 3 is applied to the control line 20. When transistor 3 is turned off, its drain resistance is large and the differential pair of transistors 1 and 2 remains balanced. Thus, transistor 1 and transistor 2 amplify the incoming signal equally and transistor 4, which amplifies the difference between the outputs of transistors 1 and 2, produces no output signal on line 12.

At time $t_1$ a second voltage level 32 of the binary control signal of sufficient magnitude to turn on transistor 3 is applied to the control line 20. When transistor 3 is turned on, its drain resistance is small and the emitter of transistor 2 now has an AC bypass to the common reference line 22 through the capacitor 19, thereby unbalancing the differential pair of transistors 1 and 2. Transistor 2 now conducts much more heavily than transistor 1, thus producing an output signal on line 12 representative of the analog input signal as illustrated by the sine wave 33 in FIG. 2.

When at time $t_2$ the voltage level of the binary control signal on control line 20 switches back to the first voltage level 31, the transistor 3 turns off again restoring balance to the transistors 1 and 2 whereby transistor 4 produces no output signal on the output line 12. This condition remains until time $t_3$ when the voltage level of the binary control signal turns on transistor 3 to commence the gating cycle again.

The aforedescribed on-off transisitions of the circuit of FIG. 1 are accomplished with very little injection of the binary control signal in the output signal on line 12, since for low drain to source voltages field effect transistor 3 behaves as a voltage controlled resistor rather than a current sink. Capacitances between the gate element and the source and drain elements of the field effect transistor 3 pass small differentiated spikes due to the binary control signal to the emitter of transistor 2 and hence on to the output on line 12 by common base action of transistor 2. Capacitor 21 minimizes this effect by passing similar spikes to the emitter of transistor 1 for common mode rejection.

Proper selection of component values of the analog gate illustrated in FIG. 1 provides a gate with a wide linear dynamic range and allows gate switching time in the low nanosecond area.

Persons skilled in the art will, of course, readily adopt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. A device for gating in response to a binary control signal, an analog signal applied to the input thereof comprising:

- a pair of amplifier circuits connected in differential circuit configuration, each of said amplifier circuits including an input coupled to said analog signal, and an output;
- means for balancing the outputs of said pair of amplifier circuits;
- means coupled to said amplifier circuit outputs for generating a signal proportional to the difference therebetween; and
- means for unbalancing the outputs of said pair of amplifier circuits in response to said binary control signal, including impedance means and switch means responsive to first and second values of said binary control signal for disconnecting and connecting, respectively, said impedance means in one of said amplifier circuits.

2. The gating device according to claim 1 wherein said switch means comprises a field-effect transistor means having its gate terminal connected to said binary control signal and having its source and drain terminals connected in series with said impedance means for inserting said impedance means in one of said amplifier circuits in parallel with said balancing means.

3. The gating device according to claim 1 wherein said impedance means comprises a capacitor connected in series with said switch means and in parallel with said means for balancing the output of one of said amplifiers.

4. A device for gating responsive to a binary control signal, an analog signal comprising:

- a pair of differentially-connected balanced transistor amplifiers each having their input connected to said analog signal;
- a first capacitor; and
- field-effect transistor means connecting responsive to said binary control signal said capacitor to one of said amplifiers to unbalance the differential output thereof.

5. The apparatus according to claim 4 further including a second capacitor interconnected of said field-effect transistor means and the other of said amplifiers to effect compensation for the capacitances between said gate element and said source and drain elements.

6. The apparatus according to claim 5 wherein said field-effect transistor means includes a field-effect transistor having a gate element connected to one side of said second capacitor and said binary control signal, and source and drain elements serially connected with said first capacitor to unbalance the differential output of said amplifiers responsive to said binary control signal.

References Cited

UNITED STATES PATENTS

| | | | |
|---|---|---|---|
| 2,081,127 | 5/1937 | Konkle | 330—69 |
| 2,092,496 | 9/1937 | Branson | 328—99 |
| 2,531,201 | 11/1950 | DeLange | 328—99 |
| 3,451,006 | 6/1969 | Grangaard | 330—69 |

DONALD D. FORRER, Primary Examiner

H. A. DIXSON, Assistant Examiner

U.S. Cl. X.R.

307—251, 254; 328—99